US 11,719,878 B2

United States Patent
Lanke et al.

(10) Patent No.: US 11,719,878 B2
(45) Date of Patent: Aug. 8, 2023

(54) ULTRA REDUCED DIAMETER OPTICAL FIBRE

(71) Applicant: Sterlite Technologies Limited, Gurgaon (IN)

(72) Inventors: Malleswarrao Lanke, Gurgaon (IN); Anand Pandey, Gurgaon (IN); Anant Pawale, Gurgaon (IN); Milind Patil, Gurgaon (IN)

( * ) Notice: Subject to any disclaimer, the term of this patent is extended or adjusted under 35 U.S.C. 154(b) by 0 days.

(21) Appl. No.: 17/085,777

(22) Filed: Oct. 30, 2020

(65) Prior Publication Data

US 2021/0132290 A1  May 6, 2021

(30) Foreign Application Priority Data

Oct. 30, 2019 (IN) .............................. 201911043933

(51) Int. Cl.
*G02B 6/02* (2006.01)
*C03C 25/1065* (2018.01)

(52) U.S. Cl.
CPC ........... *G02B 6/02395* (2013.01); *G02B 6/02* (2013.01)

(58) Field of Classification Search
None
See application file for complete search history.

(56) References Cited

U.S. PATENT DOCUMENTS

| | | | | |
|---|---|---|---|---|
| 4,904,051 A * | 2/1990 | Broer | ................ | G02B 6/02395 385/100 |
| 2004/0065118 A1* | 4/2004 | Kliner | ............... | C03B 37/01297 65/409 |
| 2011/0038593 A1* | 2/2011 | Chien | ................ | G02B 6/02395 385/141 |
| 2011/0318701 A1* | 12/2011 | Nakatate | ............. | A61C 1/0046 433/29 |
| 2017/0010411 A1* | 1/2017 | Li | ........................ | C03C 25/1065 |
| 2017/0204290 A1* | 7/2017 | Simoff | ................. | C09D 183/06 |

(Continued)

FOREIGN PATENT DOCUMENTS

| EP | 3355092 A1 * | 8/2018 | ......... G02B 6/02395 |
|---|---|---|---|
| WO | WO-2014168739 A1 * | 10/2014 | ......... G02B 6/02019 |

OTHER PUBLICATIONS

Momentive Performance Materials, RTV615 and RTV655 Technical Data Sheet, 2007, Momentive Performance Materials, Inc., 5 pages. (Year: 2007).*

(Continued)

*Primary Examiner* — Michelle R Connelly
(74) *Attorney, Agent, or Firm* — Steven R. Fairchild; Michael J. Pennington (57) ABSTRACT

An optical fibre includes a glass core, a glass cladding, a primary coating layer and a secondary coating layer. The glass cladding surrounds the glass core. The glass cladding has a cladding refractive index. The primary coating layer is sandwiched between the glass cladding and the secondary coating layer. The primary coating layer may have one of a primary in-situ modulus in the range of 0.1 to 0.2 mega pascal and a primary coating thickness in the range of 2.5 micrometers to 10 micrometers. The secondary coating layer may have one or more of the secondary in-situ modulus greater than or equal to 1.2 giga pascal and the secondary coating thickness in a range of 2.5 to 17.5 micrometers.

3 Claims, 5 Drawing Sheets

(56) References Cited

U.S. PATENT DOCUMENTS

| | | | | |
|---|---|---|---|---|
| 2019/0064433 A1* | 2/2019 | Homma | ............. | C03C 25/1065 |
| 2019/0331850 A1* | 10/2019 | Bennett | ............. | G02B 6/02395 |
| 2020/0264059 A1* | 8/2020 | Dyer | ..................... | G01L 1/242 |
| 2021/0048579 A1* | 2/2021 | Munige | ............. | G02B 6/02395 |
| 2021/0072458 A1* | 3/2021 | Pastouret | .......... | G02B 6/03694 |

OTHER PUBLICATIONS

Paschotta, Rudiger, Fused Silica, RP Photonics Encyclopedia, https://www.rp-photonics.com/fused_silica.html, accessed May 27, 2022, 8 pages. (Year: 2022).*

* cited by examiner

ULTRA REDUCED DIAMETER OPTICAL FIBRE

BACKGROUND OF THE INVENTION

Field of the Invention

The present disclosure relates to the field of optical fibre. More particularly, the present disclosure relates to optical fibre with a reduced diameter.

Description of the Related Art

Optical fibres have acquired an increasingly important role in the field of communications. In general, optical fibre refers to a medium associated with transmission of information in the form of light pulses along a strand made of glass or plastic. In addition, the optical fibre consists of a core and a cladding. The cladding surrounds the core of the optical fibre. Moreover, the core amplifies the optical signal and the cladding confines the optical signal inside the core of the optical fibre. Also, optical fibres are characterized by In-situ Modulus. Generally, the optical fibres are widely used in telecommunications for transmitting and receiving information over long distances. Moreover, optical fibres are used in various networking fields. The optical fibres are the foundation of high speed data networks and deployed extensively through the world. Since the data consumption rate is significantly rising and consumer become more data voracious it is imperative to deploy and create high speed data networks with enhanced capacity.

To increase the capacity and to meet the demands, the optical fibre cable needs to have more optical fibre capacity in it. The factor that affects the overall size and no of fibres inside the cable is the diameter of the optical fibre. One of the major challenges is to decrease the overall optical fibre diameter as the duct space is limited. Further, to reduce the diameter of the optical fibre, reduction in the primary and secondary coatings of the optical fibre is required. The reduction in coatings of the optical fibre translates to attenuation, PT breaks and reduced strength. Also, to make the optical fibre more universal, having more universal splicing capability with all category fibres, the optical fibres needs to evolved as fusion of multiple fibres or have the capability of all the fibres in one.

The significantly matured G652.D category fibres have already taken millions of kms in current FTTX infrastructure. The one advantage that G652D category fibres have, is its ultra-splicing capabilities but average macro-bending characteristics. To address the need to enhance the macro-bending, the G657A2 and G657A1 optical fibres have been developed and evolved. The replacement of G652.D fibres with G657.A2 or G657 A1 can be a solution. However, G657.A2 or G657 A1 has their own issues when it comes to splicing capabilities. It is usually noticed that there is a persisting problem of using G.657.A2 fibres, because of OTDR artifacts that occur when splicing them to standard single mode fibres i.e. G.652D.

There is always a need to develop an optical fibre that exhibits the property of both G657A2 and G657D so as to achieve flexible splicing capability as well as good macro bend performance. i.e. easy splicing of G.657.A2/A1 with G.652.D. There always seems to be a need to develop an optical fibre which would have an optimize design with good macro-bend characteristics, reduced diameter, as well as is also compliant to current network installed G.652.D. For example, G657A2 has a mode field diameter is the range as same as mode field diameter as that of G.652.D or the exactly same.

BRIEF SUMMARY OF THE INVENTION

In an aspect, the present disclosure relates to an optical fibre. The optical fibre includes a glass core, a glass cladding, a primary coating layer and a secondary coating layer. The secondary coating layer has a secondary in-situ modulus greater than or equal to 1.2 giga pascal.

A primary object of the present disclosure is to provide an optical fibre.

The optical fibre may include a primary coating layer. The primary coating layer is sandwiched between the glass cladding and the secondary coating layer. Further, the primary coating layer may have one of a primary in-situ modulus in the range of 0.1 to 0.2 mega pascal and a primary coating thickness in the range of 2.5 micrometers to 10 micrometers.

The secondary coating layer may have a secondary coating thickness in the range of 2.5 to 17.5 micrometers.

The optical fibre may have a diameter of 140 to 180 micrometers.

The optical fibre splices with standard single mode fibre such that the optical fibre may have full compatibility with a G652.D category installed optical fibres and G657.A1 category optical fibre.

In another aspect, the present disclosure provides the optical fibre. The optical fibre includes the glass core, the glass cladding and the secondary coating layer. The secondary coating layer has the secondary coating thickness in the range of 2.5 to 17.5 micrometers.

The secondary coating layer may have the secondary in-situ modulus greater than or equal to 1.2 giga pascal.

The optical fibre may have the diameter of 140 to 180 micrometers.

In yet another aspect, the present disclosure provides the optical fibre. The optical fibre includes the glass core, the glass cladding and the coating over the glass cladding. The glass cladding surrounds the glass core. The glass cladding has a cladding refractive index. The coating has a coating refractive index. Absolute difference between the cladding refractive index and the coating refractive index is greater than 0.01.

The coating may include the primary coating layer and the secondary coating layer. The primary coating layer may have one or more of a primary in-situ modulus in a range of 0.1 to 0.2 mega pascal and the primary coating thickness in a range of 2.5 micrometers to 10 micrometers. The secondary coating layer may have one or more of the secondary in-situ modulus greater than or equal to 1.2 giga pascal and the secondary coating thickness in a range of 2.5 to 17.5 micrometers.

REFERENCE NUMERALS IN THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. The optical fibre.
102. The geometrical center.
104. The longitudinal axis.
106. The glass core.
108. The glass cladding.
110. The primary coating layer.
112. The secondary coating layer.
200. The coating die.
202. The primary coating die nib.
204. The secondary coating die nib.
206. First die cup surface.
208. Second die cup surface.
θ1. The first angle.
θ2. The second angle.
θ3. The third angle.
θ4. The third angle.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1A:
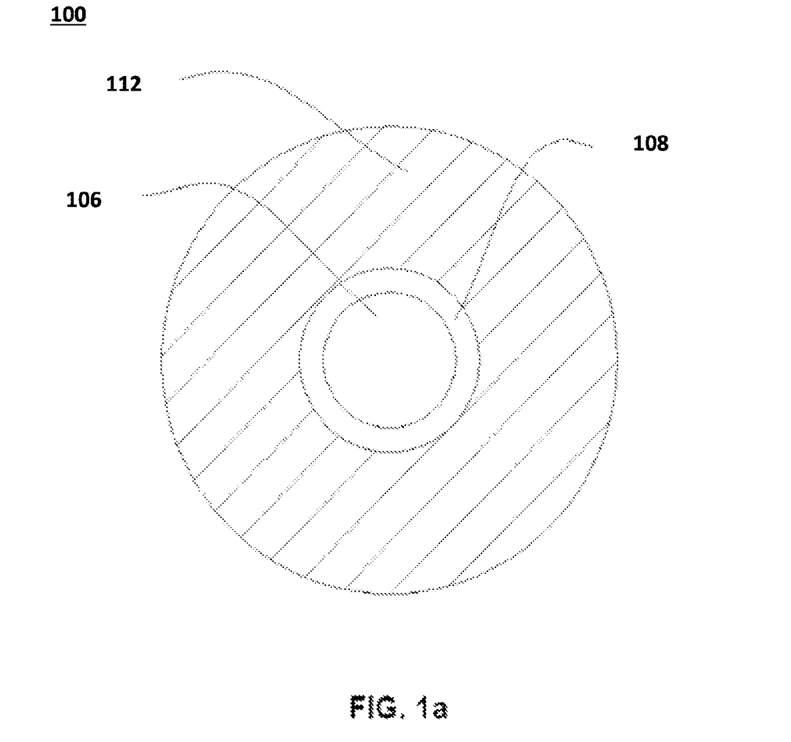
FIG. 1A illustrates a cross-sectional view of an optical fibre with a glass core, a glass cladding, and a secondary coating layer.
Figure 1B:
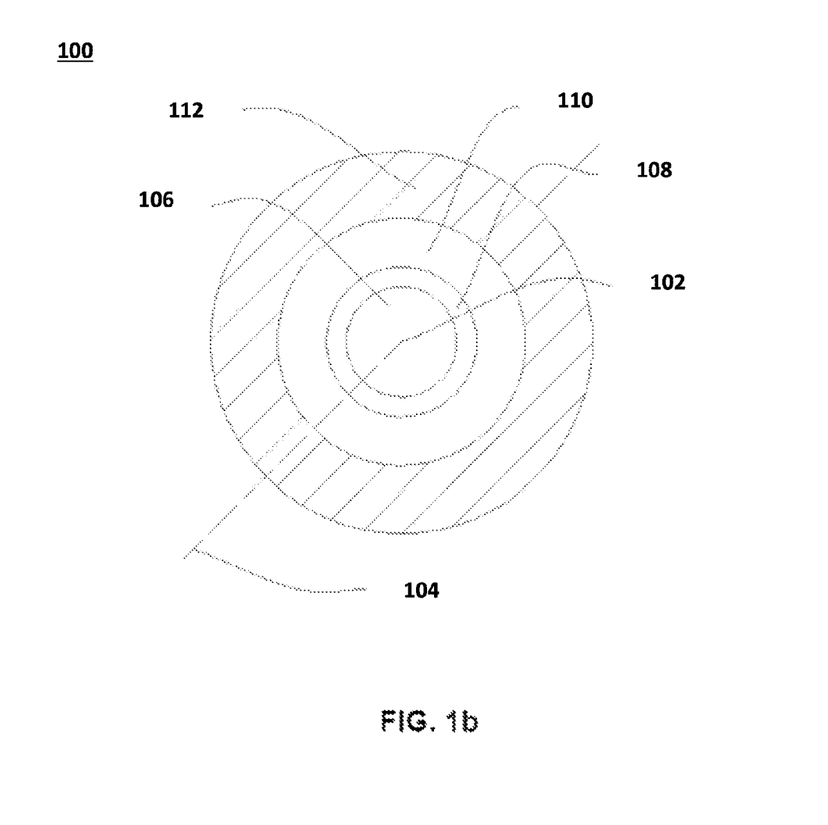
FIG. 1B illustrates the cross-sectional view of the optical fibre with a primary coating layer.
Figure 2A:
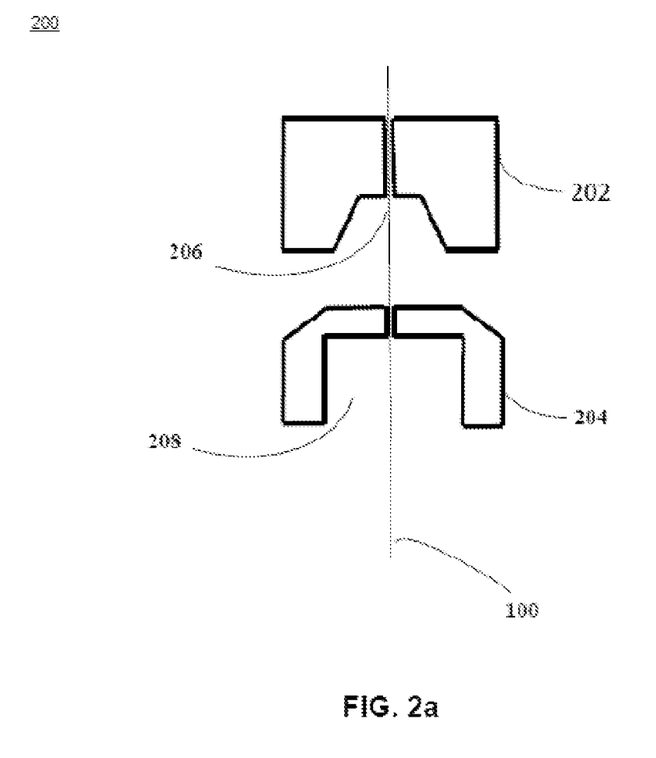
FIG. 2A illustrates a cross-sectional view of a coating die.
Figure 2B:
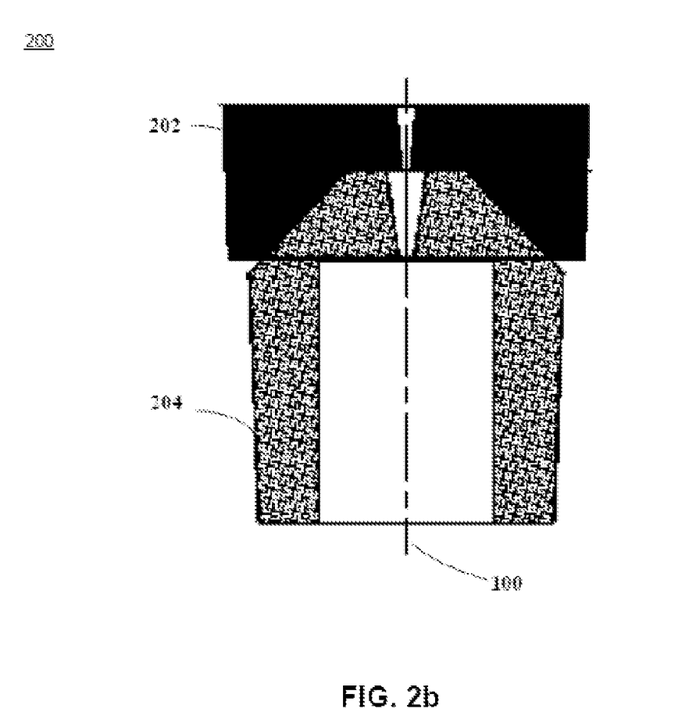
FIG. 2B illustrates an arrangement of the primary coating die nib and the secondary coating die nib.
Figure 2C:
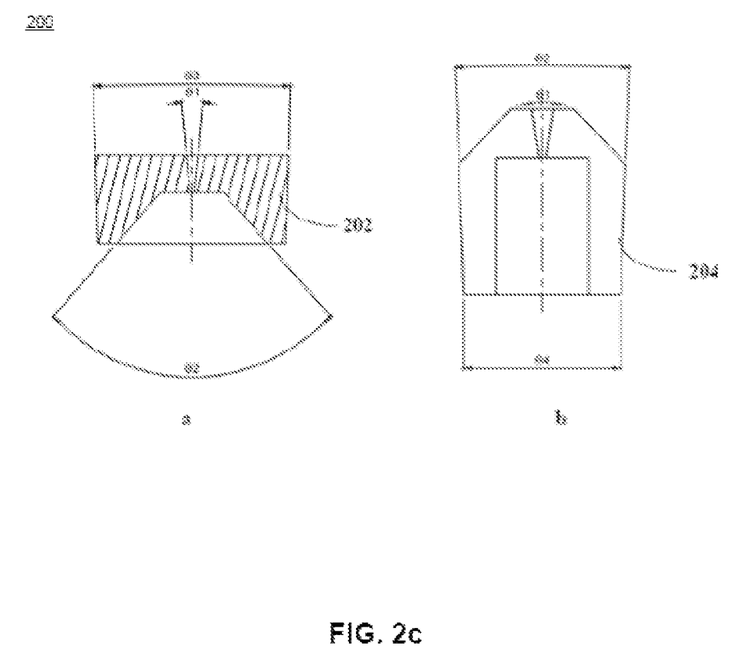
FIG. 2C illustrates the coating die having the primary coating die nib and the secondary coating die nib adjusted at one or more angles.

According to FIG. 1 and FIG. 2, this is a cross-sectional view of an optical fibre 100. In general, optical fibre is a thin flexible fibre that is used for transmission of information as light pulses. In addition, the optical fibre 100 is used as a medium that carries light from one end to other end. In general, optical fibres are used in telecommunications to transmit telephone signals, internet communication, cable television signals and the like.

The optical fibre 100 is defined along a longitudinal axis 104 passing through a geometrical center 102 of the optical fibre 100. In general, longitudinal axis of the optical fibre is an imaginary axis along lengthwise direction of the optical fibre. The longitudinal axis 104 passes through the geometrical center 102. The geometrical center 102 of the optical fibre 100 is central point of the optical fibre 100. In other words, the geometrical center 102 of the optical fibre 100 is defined as midpoint of the diameter of the optical fibre 100. The optical fibre 100 is circular in shape. The optical fibre 100 may be of any shape. The optical fibre 100 is identical and compliant to ITUT G657A1 optical fibre. The optical fibre 100 is identical and compliant to ITUT G657A2 optical fibre. The optical fibre 100 is and compliant to ITUT G657B3 optical fibre.

The optical fibre 100 is manufactured by manufacturing a preform using various preform manufacturing techniques. The various preform manufacturing techniques include but may not be limited to outside vapor deposition (OVD), Rod-in-Cylinder or Rod-in Tube, vapor axial deposition (VAD), PCVD and modified chemical vapor deposition (MCVD) or suitable combination of any of them.

The preform is manufactured using the outside vapor deposition. Generally, in the outside vapor deposition, a preform is made from ultra-pure vapors using a traversing burner and form fine soot particles of glass. The soot particles are deposited on surface of a rotating target rod. After the deposition of soot particles on the surface of the rotating target rod, the rotating target rod is removed and preform is manufactured.

The preform is manufactured using the outside vapor deposition. In general, the outside vapor deposition is used to manufacture a porous glass preform. In the outside vapor deposition process, the porous glass preform is fabricated by the deposition of fine soot particles onto the surface of a mandrel through flame hydrolysis. The starting material is deposited over a rotating mandrel and porous soot preform is grown on the mandrel. The starting material is volatile organic compound that include but may not be limited to $SiCl_4$, $GeCl_4$ and $O_2$. The porous soot preform is heated to create a transparent glass preform that further drawn into optical fibre.

The optical fibre 100 is drawn from the preform. In an example, tip of the preform is lowered into a draw furnace. In addition, gasses are injected into the furnace to provide a clean atmosphere. Further, tightly controlled temperatures in the furnace soften the tip of the preform. Furthermore, the softening point of the preform tip is reached and gravity takes over and allows a molten gob to fall freely until stretched into a thin strand of the optical fibre 100.

The optical fibre 100 includes a glass core 106, a glass cladding 108 and a coating over the glass cladding 108. The coating may include a primary coating layer 110 and a secondary coating layer 112. The center of the glass core 106 of the optical fibre 100 and the geometrical center 102 of the optical fibre 100 coincide with each other.

The glass core 106 is an innermost portion of the optical fibre 100. In general, core of the optical fibre facilitates propagation of light. The relative refractive index of the glass core 106 may be of any suitable value. The glass core 106 is associated with doped composition of $GeO_2$ and chlorine. In addition, fluorination of the glass core 106 is performed.

The optical fibre 100 includes the glass cladding 108. The glass cladding 108 surrounds the glass core 106. In general, cladding has lower refractive index than core. The lower refractive index of the glass cladding 108 enables total internal reflection of light waves inside the glass core 106 and propagation of light waves within the glass core 106. In general, total internal reflection is a phenomenon that occurs when a propagated wave strikes a medium boundary at an angle larger than particular critical angle. The glass cladding 108 surrounds the glass core 106. The glass cladding 108 has a cladding relative refractive index. The cladding relative refractive index of the glass cladding 108 is defined as RI and may be of any suitable value. The glass cladding 108 may have any suitable composition. The cladding may be down doped or up-doped.

The coating has a coating relative refractive index. Absolute difference between the cladding refractive index and the coating refractive index is greater than 0.01. The primary coating layer 110 may surround the glass cladding 108 of the optical fibre 100. The primary coating layer 110 is sandwiched between the glass cladding 108 and the secondary coating layer 112. The primary coating layer 110 is an inner coating layer. In addition, relative refractive index of the primary coating layer 110 is defined as $RI_{PC}$ and may be of any suitable value. Further, the primary coating layer 110 may help in retaining optical properties and of low in-situ modulus. The secondary coating layer 112 may surround the primary coating layer 110 and provide strength and rigidity to the optical fibre 100 and generally has high in-situ modulus than primary coating. The secondary coating layer 112 may prevent micro-bending losses in the optical fibre 100. The primary coating layer 110 may have a diameter in a range of about 130 to 145 micrometers. The diameter of the primary coating layer 110 may vary. The secondary coating layer 112 may have a diameter in a range of about 130 to 160 micrometers.

The primary coating layer 110 may have a primary coating thickness in the range of 2.5 micrometers to 10 micrometers. The primary thickness of the primary coating layer 110 may be of any suitable value. The primary coating layer 110 may have in-situ modulus in range of 0.1 to 0.2 mega-Pascal. The primary coating layer 110 may have in-situ modulus of about 0.15 mega-pascal, preferably less than 0.2 mega pascal. In addition, in-situ modulus of the primary coating layer 110 may vary.

The optical fibre 100 may have at least one of a dispersion of up to 18 picosecond/(nanometer-kilometer) at wavelength of 1550 nanometer. In addition, the optical fibre 100 may have a zero dispersion wavelength in range of about 1300 nanometer to 1324 nanometer. Further, the optical fibre 100 may have a cable cut off wavelength of up to 1260 nanometer. Furthermore, the optical fibre 100 may have a core clad concentricity error of up to 0.5. Moreover, the optical fibre 100 may have cladding non-circularity percentage of up to 0.7 percent. Also, the optical fibre 100 may have a zero dispersion slope of up to 0.092 picosecond/(nanometer2.kilometer). The optical fibre 100 may have a prof testing (kpsi) of at least 100 or more. In addition, the optical fibre 100 may have a coating strip force in between 1.3-5.0 Newton. Further, the optical fibre 100 may have a fibre curl of at least 4 meters or more.

The optical fibre 100 is associated with a micro bending loss. The micro bending loss is determined by various methods and one of the methods is sandpaper method. The optical fibre 100 may be winded on a spool. In addition, the spool may have diameter of about 140 millimeters. Further, the spool is associated with winding tension. Furthermore, winding tension may have a value of about 250 grams. Moreover, value of winding tension may vary. Also, sandpaper is posted on surface of the spool. Also, the sandpaper is posted using double sided tape. Also, the sandpaper method or test provides the micro-bending induced loss. Also, the induced micro-bending loss may have a value of up to 3 decibel per kilometer for the optical fibre 100. The optical fibre 100 may have a mode field diameter is in the range of 8.2 micrometers to 9.7 micrometers at a wavelength of 1310 nanometers. The optical fibre 100 may have at least one of macro-bend loss up to 0.5 decibel per turn corresponding to wavelength of 1550 nanometer at bending radius of 7.5 millimeter. The optical fibre 100 may have a macro-bend loss up to 1.0 decibel per turn corresponding to wavelength of 1625 nanometer at bending radius of 7.5 millimeter.

The optical fibre 100 includes the secondary coating layer 112. The secondary coating layer 112 may surround the primary coating layer 110. The secondary coating layer 112 is an outer coating layer. The secondary coating layer 112 may be made of any suitable material.

The secondary coating layer 112 may have diameter of about 195 micrometers. The second coating layer 112 may have diameter in a range of about 170 micrometers to 195 micrometers. The diameter of the secondary coating layer 112 may vary. The secondary coating layer 112 has in-situ modulus of at least 1.2 giga-pascal or more. In addition, in-situ modulus of the secondary coating layer 112 may vary. The secondary coating layer 112 has a secondary coating thickness in the range of 2.5 to 17.5 micrometers. The secondary thickness of the secondary coating layer 112 may vary.

The application of the coating on the optical fibre 100 is associated with one or more control process parameters. The one or more control process parameters for the application of the primary and secondary coating on the optical fibre 100 include pressure control process parameters, coating concentricity control process parameters and the like. In addition, for the application of the primary and secondary coating on the optical fibre 100 associated with pressure control process parameter may have pressure maintained in a range of about 3 bar to 7 bar. Further, range of pressure may vary. Furthermore, pressure control process parameter is maintained in the range of about 3 bar to 7 bar for the primary coating layer 110 and the secondary coating layer 112. Moreover, pressure control process parameter maintains a pressure difference between the primary coating layer 110 and the secondary coating layer 112. The optical fibre diameter less than 165 micrometers, preferably less than or equal to 160 micrometer achieved with the pressure difference associated between the primary coating layer 110 and the secondary coating layer 112 may have a maintained value of up to 2 bar. The pressure difference associated between the primary coating layer 110 and the secondary coating layer 112 may vary.

The optical fibre 100 is associated with coating concentricity control process parameter. The Process control process parameter for primary and secondary coating controls the diameter of the optical fibre 100 and reduced diameter optical fibre 100 may subject to uncontrolled coating concentricity. The coating concentricity control process parameter controls concentricity of coating on the optical fibre 100. Further, coating concentricity control process parameter manages relative refractive index $RI_{PC}$ of the primary coating layer 110. In addition, coating concentricity control process parameter manages relative refractive index $RI_{SC}$ of the secondary coating layer 112. The minimum absolute difference of refractive index between glass cladding 108 and coatings (primary coating layer and secondary coating layer) has a value of about 0.01. In addition, sufficient relative refractive index difference between the glass cladding 108 and the primary coating layer 110 generates diffraction pattern with high contrast patterns for concentricity monitors. The reference wavelength is about 633 nanometers.

The optical fibre 100 is coated with the primary coating 110 and the secondary coating 112. The application of the primary coating 110 and the secondary coating 112 is achieved from a coating die.

According to FIG. 2A, this is a cross-sectional view of a coating die 200. The coating die 200 may include two components: a primary coating die nib 202 and a secondary coating die nib 204. The primary coating die nib 202 is placed above the secondary coating die nib 204. In addition, various positioning of the coating die nibs may be possible.

The primary coating die nib 202 may have a first die cup surface 206 and a first center hole. The first center hole is defined by a first center and a first diameter. The secondary coating die nib 204 may have a second die cup surface 208 and a secondary center hole. The secondary center hole is defined by a secondary center and a second diameter. The secondary center hole of the secondary coating die nib 204 is more than the primary center hole of the primary coating die nip 202. The optical fibre 100 coated with the primary coating layer 110, may have a diameter in the range of 130 micrometers to 145 micrometers that is achieved by the design of the primary coating die nib 202. The optical fibre 100 having the secondary coating layer 112 may have the diameter in the range of 130 micrometers to 160 micrometers that is achieved due to the design of the secondary coating die nib 204.

In other words, due to the novel design of the coating die 200 as disclosed in the present invention, it is possible to produce the optical fibre 100 having any diameter.

According to FIG. 2B, this is an arrangement of the primary coating die nib 202 and the secondary coating die nib 204. The primary coating die nib 202 and the secondary coating die nib 204 are designed in such a way that the secondary coating die nib 204 is positioned within the primary coating die nib 202.

According to FIG. 2C, this is the coating die 200 having the primary coating die nib 202 and the secondary coating die nib 204 adjusted at one or more angles. The primary coating die nib 202 may be adjusted and rearranged with a first angle $\theta_1$, a second angle $\theta_2$ and a third angle $\theta_3$ associated with the structure of the primary coating die nib 202. The secondary coating die nib 204 may be adjusted and rearranged with a first angle $\theta_1$, a second angle $\theta_2$ and a third angle $\theta_4$ associated with the structure of the secondary coating die nib 204. The diameter of the primary coating layer 110 of the optical fibre 100 is controlled by the primary coating die nib 202 by changing the first angle $\theta_1$ of the primary coating die nib 202. The change in the first angle $\theta_1$ of the primary coating die nib 202 affects and imparts change in the second angle $\theta_2$ and the third angle $\theta_3$ of the primary coating die nib 202 resulting in the overall structure change in the primary coating die nib 202. On the other hand, the diameter of the secondary coating layer 112 of the optical fibre 100 is controlled by the secondary coating die nib 204 by changing the first angle $\theta_1$ of the secondary coating die nib 204. The change in the angle first $\theta_1$ of the secondary coating die nib 204 affects and imparts change in the second angle $\theta_2$ and the third angle $\theta_4$ of the secondary coating die nib 204 resulting in the overall structure change in the primary coating die nib 202.

The diameter of the optical fibre 100 can be controlled by the arrangements of the primary coating die nib 202 and the secondary coating die nib 204 as shown in FIG. 2B. In addition, a desired diameter of the optical fibre 100 can be obtained by utilizing the arrangement of the coating die 200 mentioned in the present invention.

In addition, changing the first angle $\theta_1$ of the secondary coating nib 204 may help in achieving the desired diameter of the secondary coating layer 112 in the range of about 130 to 160 micrometers with a tolerance of ±5 micrometer. Further, the change in the first angle $\theta_1$ of the secondary coating nib 204 may result in the change in the first angle $\theta_1$, second angle $\theta_2$ and third angle $\theta_3$ of the primary coating die nib 202 that may further help in achieving the desired diameter of the primary coating layer 110 in the range of about 130 micrometers to 145 micrometers.

In addition, any desired variation for the diameter of the primary coating layer 110 and the secondary coating layer diameter 112 of the optical fibre 100 can be achieved by adjusting the angles of the primary coating die nib 202 and the secondary coating die nib 204.

Further, the tolerance for the diameter of the secondary coating is 112 is ±5 micrometers.

The optical fibre 100 with a bare diameter of about 125 (±5) micrometer, when passed through the coating die 200 during the optical fibre drawing process, is stable as the coating die design mitigates the issue of turbulence in the optical fibre 100, reduces the PT breaks and maintains the strength and optical properties.

The optical fibre 100 is characterized by a diameter. The optical fibre 100 may have diameter of about 160 micrometers. The optical fibre 100 may have maximum diameter of about 170 micrometers. The optical fibre 100 may have a diameter of 180 micrometers. In addition, the diameter of the optical fibre 100 may vary. The optical fibre 100 belongs to ITU-T G657 category of fibres. However, the optical fibre 100 is not limited to the aforementioned category of fibres.

The optical fibre 100 is compliant with G657.A2 bend-insensitive fibre that splices seamlessly with standard single mode fibres. Further, the optical fibre 100 is compliant with G657.A2 bend insensitive fibre and has an optimized design with the same mode field diameter as standard G.652.D fibres to ensure full compatibility with a G.652.D installed optical fibre base. The optical fibre 100 may enable next-level cable designs and bend performance, while streamlining field optical time domain reflectometer (OTDR) testing protocols.

The optical fibre 100 may have extreme bend performance of a G.657.A2 category optical fibre with the splicing convenience of a G.657.A1 design. The optical fibre 100 may have a bend-insensitive property that assists in conserving optical power in closures and other locations where bending losses can quickly add up, further improving optical power margins.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. An optical fibre comprising:
    a glass core;
    a glass cladding that surrounds the glass core has a cladding refractive index; and
    a coating over the glass cladding, wherein the coating has a coating refractive index, wherein absolute difference between the cladding refractive index and the coating refractive index is greater than 0.01, wherein the coating includes:
        a primary coating layer that surrounds the glass cladding; and
        a secondary coating layer that surrounds the primary coating layer, wherein the secondary coating layer has a secondary in-situ modulus greater than or equal to 1.2 giga pascal, wherein the optical fibre has a diameter of 160 to 180 micrometers, wherein the secondary coating layer has a secondary coating thickness in a range of 2.5 to 17.5 micrometers,
    wherein the optical fibre has a zero dispersion slope of up to 0.092 picosecond/(nanometer2.kilometer).

2. The optical fibre as claimed in claim 1, wherein the primary coating layer has one of a primary in-situ modulus is in a range of 0.1 to 0.2 mega pascal and a primary coating thickness in a range of 2.5 micrometers to 10 micrometers.

3. The optical fibre as claimed in claim 1, wherein the optical fibre splices with standard single mode fibre.

* * * * *